United States Patent
Pajukoski et al.

(10) Patent No.: US 10,383,111 B2
(45) Date of Patent: *Aug. 13, 2019

(54) ACK/NACK CHANNELIZATION FOR RESOURCE BLOCKS CONTAINING BOTH ACK/NACK AND CQI

(71) Applicant: Nokia Solutions and Networks Oy, Espoo (FI)

(72) Inventors: Kari P. Pajukoski, Oulu (FI); Esa T. Tiirola, Kempele (FI); Kari J. Hooli, Oulu (FI); Timo E. Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,357

(22) Filed: May 15, 2015

(65) Prior Publication Data

US 2015/0264684 A1 Sep. 17, 2015

Related U.S. Application Data

(63) Continuation of application No. 12/322,128, filed on Jan. 29, 2009, now Pat. No. 9,065,646.

(Continued)

(51) Int. Cl.
*H04L 5/00* (2006.01)
*H04L 1/06* (2006.01)
(Continued)

(52) U.S. Cl.
CPC ....... *H04W 72/0446* (2013.01); *H04L 1/1671* (2013.01); *H04L 5/0053* (2013.01);
(Continued)

(58) Field of Classification Search
CPC .......... H04W 72/0446; H04W 72/0406; H04L 5/0055; H04L 5/0057; H04L 5/0053;
(Continued)

(56) References Cited

U.S. PATENT DOCUMENTS 6,378,099 B1 4/2002 Rowitch ................. 714/748
7,852,959 B2 12/2010 Kwak et al. ............ 375/260
(Continued)

FOREIGN PATENT DOCUMENTS

CN 1885759 A 12/2006
EP 1 353 523 A1 10/2003
(Continued)

OTHER PUBLICATIONS

Samsung: "ACK/NAK. Repetitions in E-UTRA UL" 3GPP Draft; R1-080677 ACK_NAK_REPEAT, 3rd Generation Partnership Project (3GPP), Mobile Competence Centre ; 650, Route Des Lucioles.; F-06921 Sophia-Antipolis Cedex ; France, vol. RAN WG1, No. Sorrento, Italy; 20080205, Feb. 5, 2008 (Feb. 5, 2008), XP050109173 [retrieved on Feb. 5, 2008] the whole document.

(Continued)

*Primary Examiner* — Christopher P Grey
(74) *Attorney, Agent, or Firm* — Harrington & Smith

(57) ABSTRACT

In one exemplary embodiment, a method includes: transmitting a value from an access node towards an apparatus, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and receiving at least one transmission using at least one of the first portion and the second portion.

15 Claims, 8 Drawing Sheets

Related U.S. Application Data

(60) Provisional application No. 61/063,671, filed on Feb. 4, 2008, provisional application No. 61/067,313, filed on Feb. 26, 2008.

(51) Int. Cl.
*H04W 72/04* (2009.01)
*H04L 1/16* (2006.01)
*H04L 1/12* (2006.01)

(52) U.S. Cl.
CPC .......... *H04L 5/0055* (2013.01); *H04L 5/0057* (2013.01); *H04L 5/0092* (2013.01); *H04W 72/0406* (2013.01); *H04L 1/0675* (2013.01); *H04L 5/0007* (2013.01); *H04L 5/0016* (2013.01); *H04L 2001/125* (2013.01)

(58) Field of Classification Search
CPC ................. H04L 1/1671; H04L 5/0092; H04L 2001/125; H04L 5/0016; H04L 5/0007; H04L 1/0675
See application file for complete search history.

(56) References Cited

U.S. PATENT DOCUMENTS

| | | | |
|---|---|---|---|
| 7,965,760 B2 | 5/2011 | Futagi et al. | 375/146 |
| 8,031,688 B2 | 10/2011 | Papasakellariou et al. | 370/344 |
| 8,077,693 B2 * | 12/2011 | Zhang | H04L 5/0055 370/203 |
| 8,121,175 B2 | 2/2012 | Futagi et al. | 375/146 |
| 8,189,518 B2 * | 5/2012 | Imamura | H04L 5/0055 370/329 |
| 2004/0131026 A1 | 7/2004 | Kim et al. | 370/328 |
| 2005/0201325 A1 * | 9/2005 | Kang | H04L 1/1614 370/328 |
| 2005/0213575 A1 * | 9/2005 | Shin | H04L 1/1628 370/389 |
| 2006/0133521 A1 | 6/2006 | Sampath et al. | 375/260 |
| 2006/0223543 A1 | 10/2006 | Usuda et al. | 455/450 |
| 2006/0255989 A1 | 11/2006 | Kim et al. | 341/120 |
| 2008/0026744 A1 * | 1/2008 | Frederiksen | H04L 1/0026 455/425 |
| 2008/0080422 A1 | 4/2008 | Frederiksen et al. | 370/329 |
| 2008/0123593 A1 | 5/2008 | Fjuita et al. | 370/330 |
| 2008/0175195 A1 * | 7/2008 | Cho | H04L 1/1607 370/329 |
| 2008/0225788 A1 * | 9/2008 | Inoue | H04L 1/0006 370/329 |
| 2008/0273547 A1 | 11/2008 | Phinney | 370/437 |
| 2008/0310540 A1 | 12/2008 | Tiirola et al. | 375/267 |
| 2008/0311942 A1 * | 12/2008 | Kim | H04L 1/1854 455/509 |
| 2008/0316957 A1 * | 12/2008 | Shen | H04J 13/00 370/328 |
| 2009/0010240 A1 | 1/2009 | Papasakellariou et al. | 370/344 |
| 2009/0245198 A1 | 10/2009 | Tiirola et al. | 370/330 |
| 2010/0002655 A1 | 1/2010 | Ofuji et al. | 370/335 |
| 2010/0111005 A1 * | 5/2010 | Ahn | H04L 5/0007 370/329 |

FOREIGN PATENT DOCUMENTS

| | | |
|---|---|---|
| EP | 1 655 874 A2 | 5/2006 |
| EP | 1816883 A1 | 8/2007 |
| JP | 2010-205337 | 9/2010 |
| RU | 2003 128 063 A | 3/2005 |
| RU | 2 315 426 C1 | 1/2008 |
| WO | WO 2004/017578 A1 | 2/2004 |
| WO | WO 2007/044414 A1 | 4/2007 |

OTHER PUBLICATIONS

NTT Docomo et al: "Implicit Resource Allocation of ACK/NACK Signal in E-UTRA Uplink" 3GPP TSG-RAN WG1 #48BIS St Julians,Malta,, vol. R1-071650, Mar. 26, 2007 (Mar. 26, 2007), pp. 1-3, XP003023819 Section 3.

Nokia Siemens Networks et al: "ACK/NACK channelization for PRBs containing both ACK/NACK and CQI" 3GPP Draft; R1-080931, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Feb. 5, 2008, Feb. 5, 2008 (Feb. 5, 2008), XP050109403 [retrieved on Feb. 5, 2008] the whole document.

Nokia: "Uplink Scheduling for VoIP" 3GPP TSG-RAN WG2 #57, St. Louis, Missouri, vol. R2-070476, Feb. 12, 2007 (Feb. 12, 2007), pp. 1-15, XP003023534 the whole document.

"3GPP TS 36.213 V8.2.0—Technical Specification Group Radio Access Network; Evolved Universial Terrestrial Radio Access (E-UTRA); Physical layer procedures (Release 8)" 3rd Generation Partnership Project (3GPP); Technicalspecification (TS), XX, XX, [Online] No. 3GPP TS 36.213 V8.2.0, Mar. 20, 2008 (Mar. 20, 2008), pp. 1-30, XP002533914 Retrieved from the Internet: URL : http://www.3gpp.org/ftp/Specs/html-info/36213.htm> Section 10.

3GPP TSG RAN WG1 Meeting #52bis, Channelization of SRI and persistent ACK/NACK on PUCCH, Shenzhen, China, RI-081460, Mar. 31-Apr. 4, 2008.

3GPP TS 36.300 V8.3.0. (Dec. 2007), $3^{rd}$ Generation Partnership Project, Technical Specification Group Radio Access Network, Evolves Universal Terrestrial Radio Access (E-UTRA) and Evolved Universal Terrestrial Radio Access Network (E-UTRAN).

NEC Group, "Multiplexing of uplink data-non-associated control signal without data", 3GPP Draft, R1-072122, 3rd Generation Partnership Project (3GPP), vol. RAN WG1, May 2, 2007, XP050105871, Section 4, Mobile Competence Centre, 650, Route Des Lucioles, F-06921 Sophia-Antipolis Cedex, France.

Panasonic, "Indication of combination between L1/L2 control signaling and uplink data", $3^{rd}$ Generation Partnership Project (3GPP), Technicalspecification Group (TSG) Radio Access Network (RAN), Workinggroup 1 (WG1), vol. R1-060793, Mar. 27, 2006, pp. 1-3, XP003019431, Section 4c, Figure1, Table1.

Texas Instruments, "Simultaneous CQI and ACK/NAK Transmission in Uplink" 3GPP Draft, R1-073431-CQIACK, 3rd Generation Partnership Project (3GPP), Mobile Competence Centre, 650 Route Des Lucioles, F-06921 Sophia-Antipolis Cedex, France, vol. RAN WG1, Athens, Greece, Aug. 15, 2007, XP050107046, Sections 1, 2, Figure 2.

Motorola, "Multiplexing of U1 L1/L2 control signals in the absence of data", 3GPP Draft, R1-072185 UL_CCH_NODATA, 3rd Generation Partnership Project (3GPP), Mobile Competence Centre, 650 Route Des Lucioles, F-06921 Sophia-Antipolis Cedex, France, vol. RAN WG1, No. Kobe, Japan, May 2, 2007, XP050105925, Sections 3, 4, 5.

Nokia Siemens Networks et al, "ACK/NACK channelization for PRBs containing both ACK/NACK and CQI", 3GPP Draft, R1-080931, 3rd Generation Partnership Project (3GPP), Mobile Competence Centre, 650 Route Des Lucioles, F-06921 Sophia-Antipolis Cedex, France, vol. RAN WG1, No. Sorrento, Italy, Feb. 5, 2008, XP050109403, Sections 1, 2.

R1-074901, "Commonality on the Cyclic Shift Hopping Patterns of ACK/NACK and CQI on PUCCH", Panasonic, 3GPP TSG RAN WG1 Meeting #51, Nov. 2007, 2 pgs.

R1-073541, "UL ACK/NACK channel structure", Samsung, 3GPPP TSG RAN WG1 Meeting #50, Aug. 2007, 4 pgs.

"Joint proposal on uplink ACK/NACK channelization", 3GPP TSG RAN WG1 Meeting #51bis, R1-080035, Jan. 2008, 6 pgs.

"Physical-layer parameters to be configured by RRC", TSG-RAN WG1 #bis, R1-080621, Jan. 2008, 6 pgs.

"$3^{rd}$ Generation Partnership Project; Technical Specification Group Radio Access Network; Evolved Universal Terrestrial Radio Access (E-UTRA); Physical Channels and Modulation (Release 8)", 3GPP TS 36.211 V.8.1.0, Nov. 2007, 54 pgs.

"$3^{rd}$ Generation Partnership Project; Technical Specification Group Radio Access Network; Evolved Universal Terrestrial Radio Access (E-UTRA) and Evolved Universal Terrestrial Radio Access Net-

(56) References Cited

OTHER PUBLICATIONS work (E-UTRAN); Overall description; Stage 2 (Release 8)", 3GPP TS 36.300 V8.2.0, Sep. 2007, 109 pgs.

* cited by examiner

| CELL SPECIFIC CYCLIC SHIFT OFFSET | | RS ORTHOGONAL COVER | | | ACK/NACK ORTHOGONAL COVER | | |
|---|---|---|---|---|---|---|---|
| $\delta_{OFFSET}=1$ / $CS_{INDEX}=1$ | $\delta_{OFFSET}=1$ / $CS_{INDEX}=0$ | $OC_{INDEX}=0$ | $OC_{INDEX}=1$ | $OC_{INDEX}=2$ | $OC_{INDEX}=0$ | $OC_{INDEX}=1$ | $OC_{INDEX}=2$ |
| 2 | 1 | k=0 | | | k=0 | | |
| 3 | 2 | | 6 | | | 6 | |
| 4 | 3 | 1 | | | 1 | | |
| 5 | 4 | | | 12 | | | 12 |
| 6 | 5 | 2 | | | 2 | | |
| 7 | 6 | | 7 | | | 7 | |
| 8 | 7 | 3 | | | 3 | | |
| 9 | 8 | | | 13 | | | 13 |
| 10 | 9 | 4 | | | 4 | | |
| 11 | 10 | | 8 | | | 8 | |
| 0 | 11 | 5 | | | 5 | | |

FIG.3

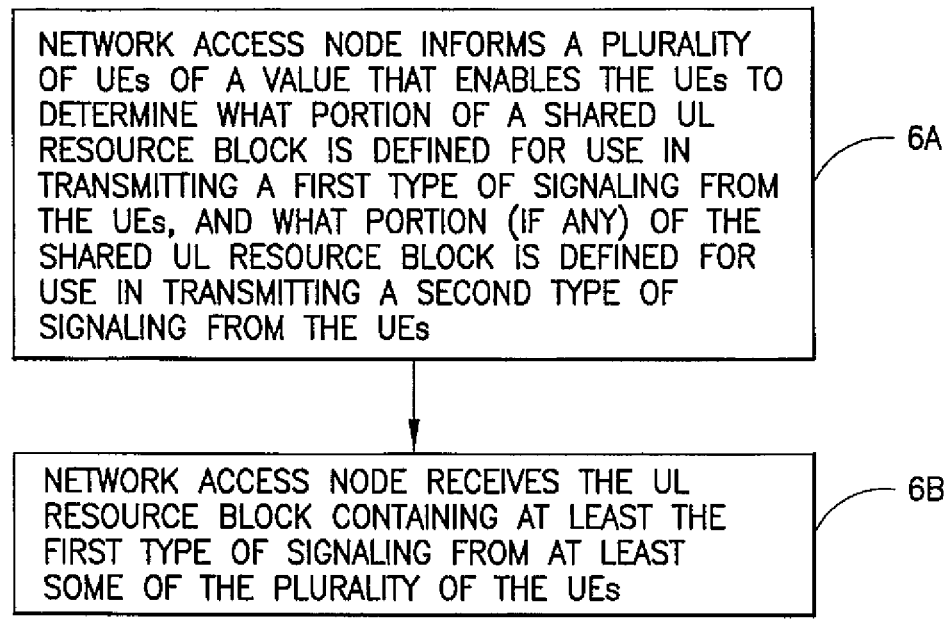

ACK/NACK CHANNELIZATION FOR RESOURCE BLOCKS CONTAINING BOTH ACK/NACK AND CQI

CROSS-REFERENCE TO RELATED US PATENT APPLICATIONS

This patent application is a continuation of commonly assigned U.S. patent application Ser. No. 12/322,128, filed 29 Jan. 2009, entitled "ACK/NACK Channelization for Resource Blocks Containing Both ACK/NACK and CQI", by Kari Pajukoski, now U.S. Pat. No. 9,065,646, which is incorporated by reference herewith in its entirety, and which claims priority under 35 U.S.C. § 119(e) from U.S. Provisional Patent Application No.: 61/063,671, filed Feb. 4, 2008, and from U.S. Provisional Patent Application No.: 61/067,313, filed Feb. 26, 2008.

TECHNICAL FIELD

The exemplary and non-limiting embodiments of this invention relate generally to wireless communication systems, methods, devices and computer programs and, more specifically, relate to signaling techniques between a mobile apparatus and a network node.

BACKGROUND

The following abbreviations that may be found in the specification and/or the drawing figures are defined as follows:
3GPP third generation partnership project
ACK acknowledge
aGW access gateway
BS base station
BW bandwidth
C-Plane control plane
CQI channel quality indicator
CS cyclic shift
DL downlink (eNB towards UE)
eNB E-UTRAN Node B (evolved Node B)
EPC evolved packet core
E-UTRAN evolved UTRAN (LTE)
FDMA frequency division multiple access
LTE long term evolution of UTRAN (E-UTRAN)
LTE-A LTE-advanced
MAC medium access control (layer 2, L2)
MM/MME mobility management/mobility management entity
NACK negative acknowledge
Node B base station
OC orthogonal cover
OFDMA orthogonal frequency division multiple access
O&M operations and maintenance
PDCP packet data convergence protocol
PHY physical (layer 1, L1)
PRB physical resource block (180 kHz)
PUCCH physical uplink control channel
PUSCH physical uplink shared channel
RB resource block
RLC radio link control
RRC radio resource control
RRM radio resource management
RS reference signal
S-GW serving gateway
SC-FDMA single carrier, frequency division multiple access
SNR signal-to-noise ratio
SR scheduling request
UE user equipment, such as a mobile station or mobile terminal
U-Plane user plane
UL uplink (UE towards eNB)
UTRAN universal terrestrial radio access network A communication system known as evolved UTRAN (E-UTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.2.0 (2007-09), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)," incorporated by reference herein in its entirety.

FIG. 1 reproduces FIG. 4 of 3GPP TS 36.300 V8.2.0, and shows the overall architecture of the E-UTRAN system 2. The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1U interface (MME/S-GW 4). The S1 interface supports a many-to-many relationship between MMEs/S-GWs and eNBs.

The eNB hosts the following functions:
  functions for RRM: RRC, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the EPC (MME/S-GW);
  scheduling and transmission of paging messages (originated from the MME);
  scheduling and transmission of broadcast information (originated from the MME or O&M); and
  a measurement and measurement reporting configuration for mobility and scheduling.

Two documents of particular interest to the ensuing discussion are 3GPP TSG RAN WG1 Meeting #51bis, R1-080035, Sevilla, Spain, Jan. 14-18, 2008, Agenda item: 6.1.4, Source: Samsung, Nokia, Nokia Siemens Networks, Panasonic, TI, Title: Joint proposal on uplink ACK/NACK channel ization (incorporated by reference, and referred to hereafter as R1-080035), and TSG-RAN WG1 #51bis, R1-080621, Sevilla, Spain, Jan. 14-18, 2008, Source: Ericsson, Title: Physical-layer parameters to be configured by RRC, (incorporated by reference, and referred to hereafter as R1-080621).

Due to implicit mapping, the ACK/NACK channel on the PUCCH needs to be pre-configured by higher layer signaling (see the section "PUCCH-structure" in R1-080621). This pre-configuration is referred to as ACK/NACK channelization. There is an existing channelization solution for the case where the given RB is used exclusively for ACK/NACK signaling (see R1-080035).

It has also been agreed that the PUCCH resources used for periodic CQI transmission (namely the CS) are semi-statically configured via higher layer signaling. Typically separate PRBs are allocated for ACK/NACK and CQI.

Additionally, it has been decided to support a multiplexing combination where ACK/NACK and CQI channels of different UEs are multiplexed into the same PRB. This combination has been seen as necessary with the smallest bandwidth options of LTE (e.g., 1.4 MHz). In that case it is not economical to have separate PUCCH PRBs for ACK/NACK and CQI due to excessive control signaling overhead. However, while the principle of ACK/NACK channelization has been agreed to, no decision has been made on the mechanism to support a mixed allocation of ACK/NACKs and CQIs in a single PUCCH PRB.

That is, at present there is no agreed upon approach to ACK/NACK channelization in the case where ACK/NACK and CQI from different UEs are multiplexed within the same PRB. Reference can be made to R1-080035 for defining the ACK/NACK channelization to be used on the PUCCH when there are no CQI signals sharing the same RB. The outcome of this channelization arrangement is the staggered-type of ACK/NACK structure, as shown herein in FIG. 3, which reproduces Table 3 from R1-080035.

Reference with regard to the ensuing description may also be made to 3GPP TR 36.211, V8.1.0 (2007-11), 3rd Generation Partnership Project; Technical Specification Group Radio Access Network; Physical Channels and Modulation (Release 8), incorporated by reference, for a description in Section 5 of the UL physical channels, including the PUCCH and the PUSCH.

SUMMARY

The below summary section is intended to be merely exemplary and non-limiting.

The foregoing and other problems are overcome, and other advantages are realized, by the use of the exemplary embodiments of this invention.

In one exemplary embodiment of the invention, a method comprising: transmitting a value from an access node towards an apparatus, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and receiving at least one transmission using at least one of the first portion and the second portion.

In another exemplary embodiment of the invention, an apparatus comprising: a transmitter configured to transmit a value towards another apparatus, where the value is indicative of a size of a first portion of an uplink resource block, where the uplink resource block is shared among a plurality of other apparatus, where the first portion is specified for transmission of a first type of signaling to the apparatus, where a second portion of the uplink resource block is specified for transmission of a second type of signaling to the apparatus; and a receiver configured to receive at least one transmission using at least one of the first portion and the second portion.

In another exemplary embodiment of the invention, a method comprising: receiving a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and transmitting at least one transmission using at least one of the first portion and the second portion.

In another exemplary embodiment of the invention, an apparatus comprising: a receiver configured to receive a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and a transmitter configured to transmit at least one transmission using at least one of the first portion and the second portion.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 3 reproduces Table 3 from R1-080035, and shows the resource allocation for a case of 18 ACK/NACK channels with normal CP.

FIG. 6 is a logic flow diagram that illustrates for the network access node (eNB) shown in FIG. 2A the operation of an exemplary method, and a result of execution of exemplary computer program instructions, in accordance with the exemplary embodiments of this invention.

FIG. 7 is a logic flow diagram that illustrates for the user equipment shown in FIGS. 2A and 2B the operation of an exemplary method, and a result of execution of exemplary computer program instructions, in accordance with the exemplary embodiments of this invention.

DETAILED DESCRIPTION

The exemplary embodiments of this invention are generally related to the 3GPP LTE standardization, in particular to Layer 1 specifications (3GPP TS 36.2XX). More specifically, the exemplary embodiments are related to the allocation of resources for periodic CQI transmission on the PUCCH in the case where ACK/NACK transmissions (PUCCH formats 1/1a/1b) and CQIs (PUCCH formats 2/2a/2b) from a plurality of UEs share the same PUCCH PRB. The exemplary embodiments provide novel techniques for allocating the resources, allowing for flexible and efficient usage of control resources with minimal impact on other system aspects.

It should be noted, however, that while the exemplary embodiments are described below in the context of the E-UTRAN (UTRAN-LTE) system, the exemplary embodiments of this invention are not limited for use with only this one particular type of wireless communication system, and they may be used to advantage in other wireless communication systems.

Figure 1:
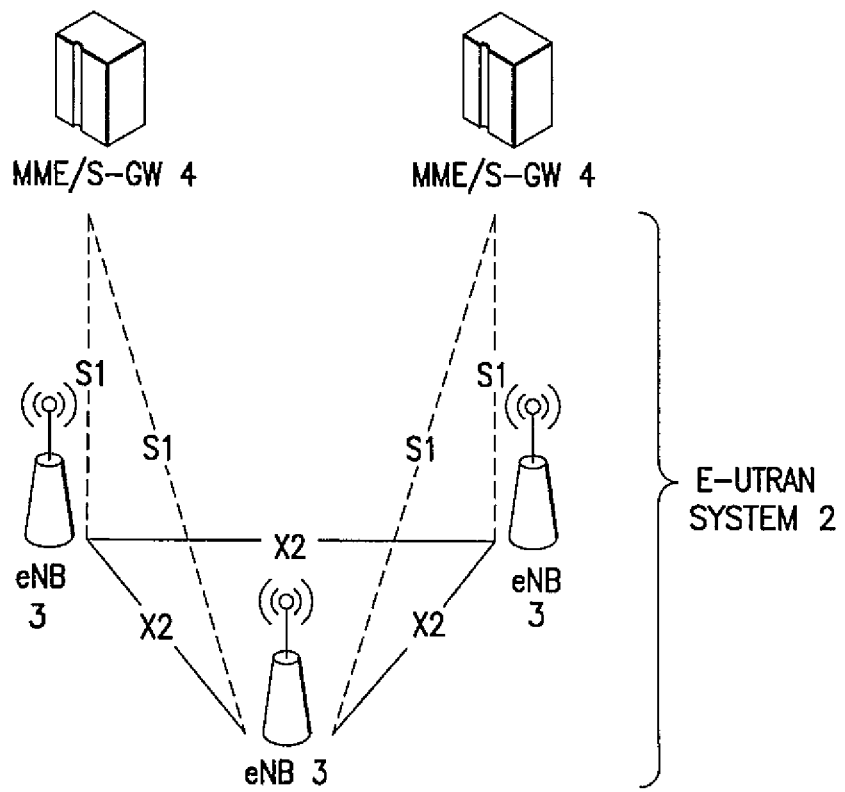
FIG. 1 reproduces FIG. 4 of 3GPP TS 36.300 V8.2.0, and shows the overall architecture of the E-UTRAN system.
Figure 2A:
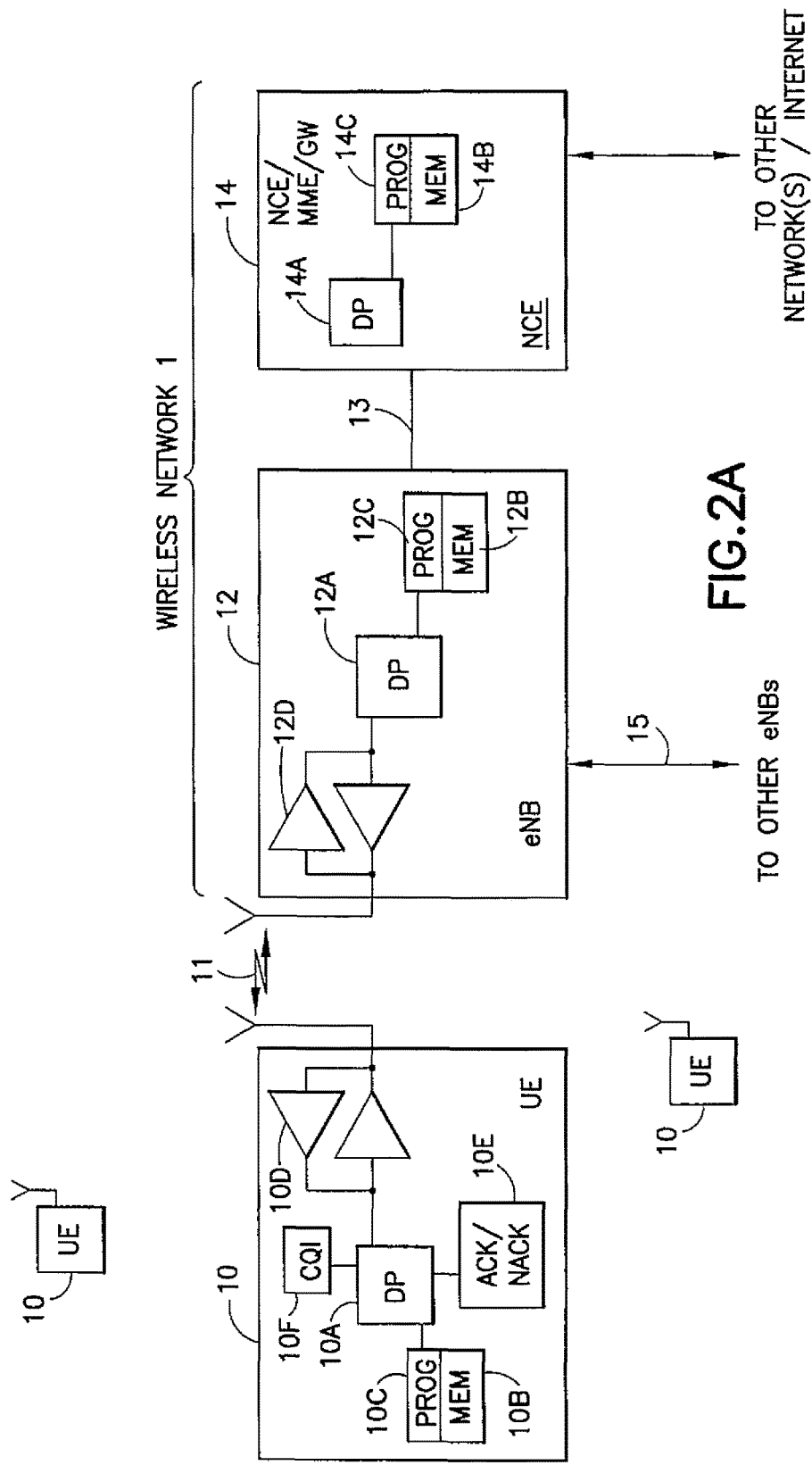
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with one or more other networks, such as a telephone network and/or a data communications network (e.g., the Internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer or a data processor (DP) 12A, a computer-readable memory medium embodied as a memory (MEM) 12B that stores a program of computer instructions (PROG) 12C, and a suitable radio frequency (RF) transceiver 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer or a data processor (DP) 14A and a computer-readable memory medium embodied as a memory (MEM) 1413 that stores a program of computer instructions (FROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

Typically there will be a plurality of UEs 10 serviced by the eNB 12. The UEs may or may not be identically constructed (e.g., similar to the UE shown in FIG. 2A), but in general are all assumed to be electrically and logically compatible with the relevant network protocols and standards needed for operation in the wireless network 1. Each of the UEs may thus be assumed to include an ACK/NACK functional unit 10E which may be used for informing the eNB 12 of the success or failure of receiving downlink transmissions, as well as a channel measurement/characterization and CQI functional unit 10F for informing the eNB 12 of channel quality information. The exemplary embodiments of this invention pertain at least in part to enabling outputs of the ACK/NACK and CQI functional units 10E, 10F to be sent in one UL RB, in conjunction with (i.e., multiplexed with) the same information sent from at least one other UE 10. In some exemplary embodiments, the DP 10A may comprise at least one of the ACK/NACK 10E and the CQI 10F. In other exemplary embodiments, at least one of the ACK/NACK 10E and the CQI 10F may be embodied in one or more processors, data processors, processing devices, processing components, processing blocks, circuits, circuit devices, circuit components, circuit blocks, integrated circuits and/or chips (e.g., chips comprising one or more circuits or integrated circuits).

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 2B:
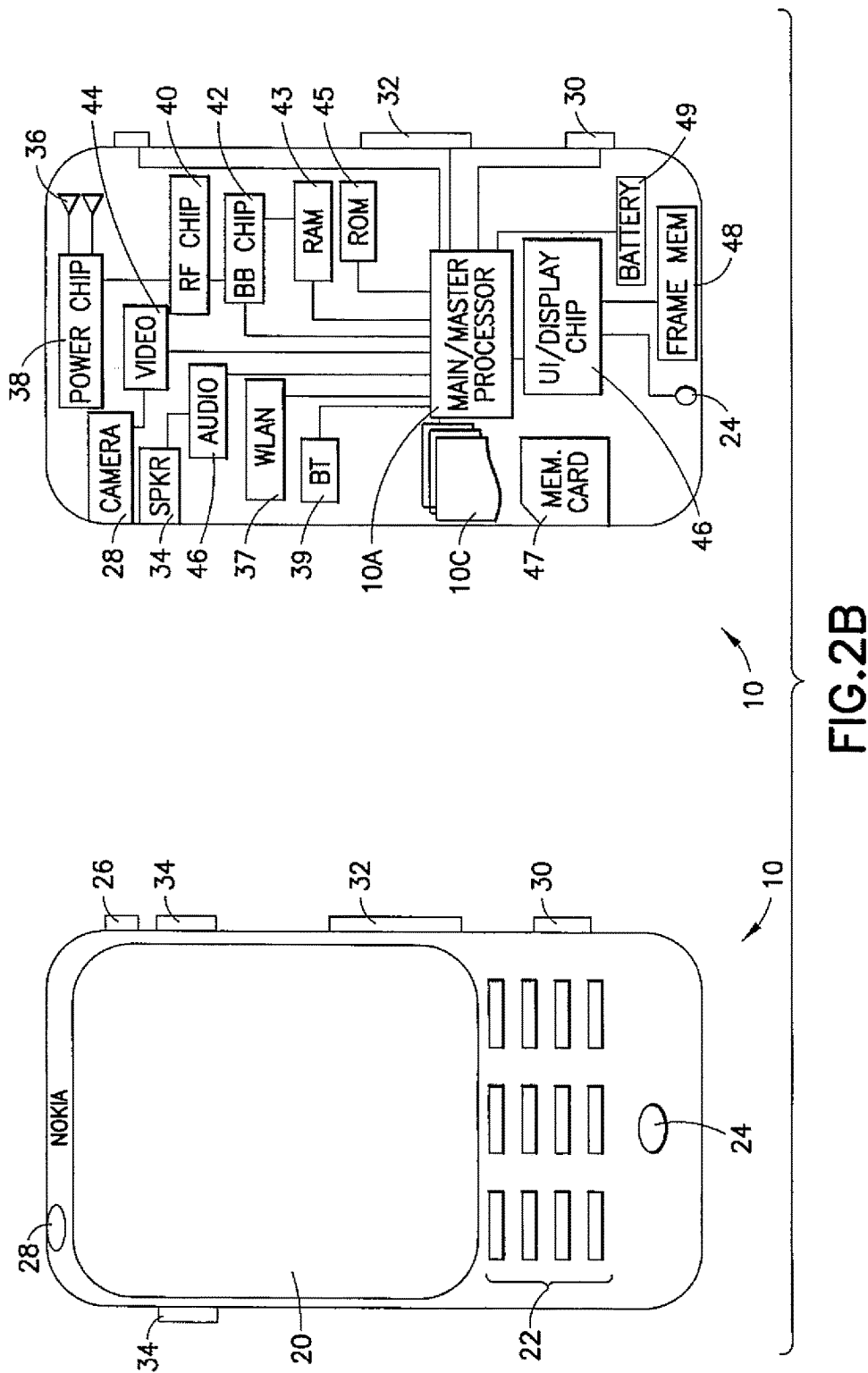
FIG. 2B shows a more particularized block diagram of an exemplary user equipment such as that shown in FIG. 2A.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 30, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention may be most relevant to the main/master processor 10A (e.g., computer instructions executed by the processor 10A), though it is noted that other exemplary embodiments need not be disposed in such devices or components, but may be disposed across various chips and/or memories as shown, or disposed within one or more other processors that combine one or more of the functions described above with respect to FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to processors, data processors, processing devices, processing components, processing blocks, circuits, circuit devices, circuit components, circuit blocks, integrated circuits and/or chips (e.g., chips comprising one or more circuits or integrated circuits).

It is noted that previously the ACK/NACK and/or CQI were signaled in the PUCCH only in the case when the UE 10 has no simultaneous data transmission. In the case where the UE 10 transmits both control and data, these signals were to be time multiplexed and transmitted on the PUSCH. However, under LTE-A a UE will be able to simultaneously transmit on the PUSCH and the PUCCH.

It is noted that PUCCH Format 1/1a/1b signals (e.g., the first type of signaling) are meant when talking about ACK/NACK. It is noted that ACK/NACK signals also cover scheduling request signaling. Correspondingly, when talking about CQI as a general term, PUCCH Format 2/2a/2b signals (e.g., the second type of signaling) are meant. Table 1 below summarizes the PUCCH Formats:

TABLE 1

PUCCH Formats

| PUCCH Formats | Control type |
|---|---|
| PUCCH Format 1 | Scheduling request |
| PUCCH Format 1a | 1-bit ACK/NACK |
| PUCCH Format 1b | 2-bit ACK/NACK |
| PUCCH Format 2 | CQI |
| PUCCH Format 2a | CQI + 1-bit ACK/NACK |
| PUCCH Format 2b | CQI + 2-bit ACK/NACK |

While the discussion herein is primarily in reference to CQI, in further exemplary embodiments different kinds of channel feedback information may be utilized. As non-limiting examples, the channel feedback information may include one or more:

Channel Quality Indicators (CQI),
Rank Indicators (RI), and
Precoding Matrix Indicators (PMI).

The exemplary embodiments of this invention provide a channelization method, apparatus and computer program for a case where sequence modulated ACK/NACK and CQI signals of different UEs are multiplexed within the same RB, and thus beneficially extend and enhance existing ACK/NACK channelization technique proposals, such as those discussed in R1-080035.

Figure 4:
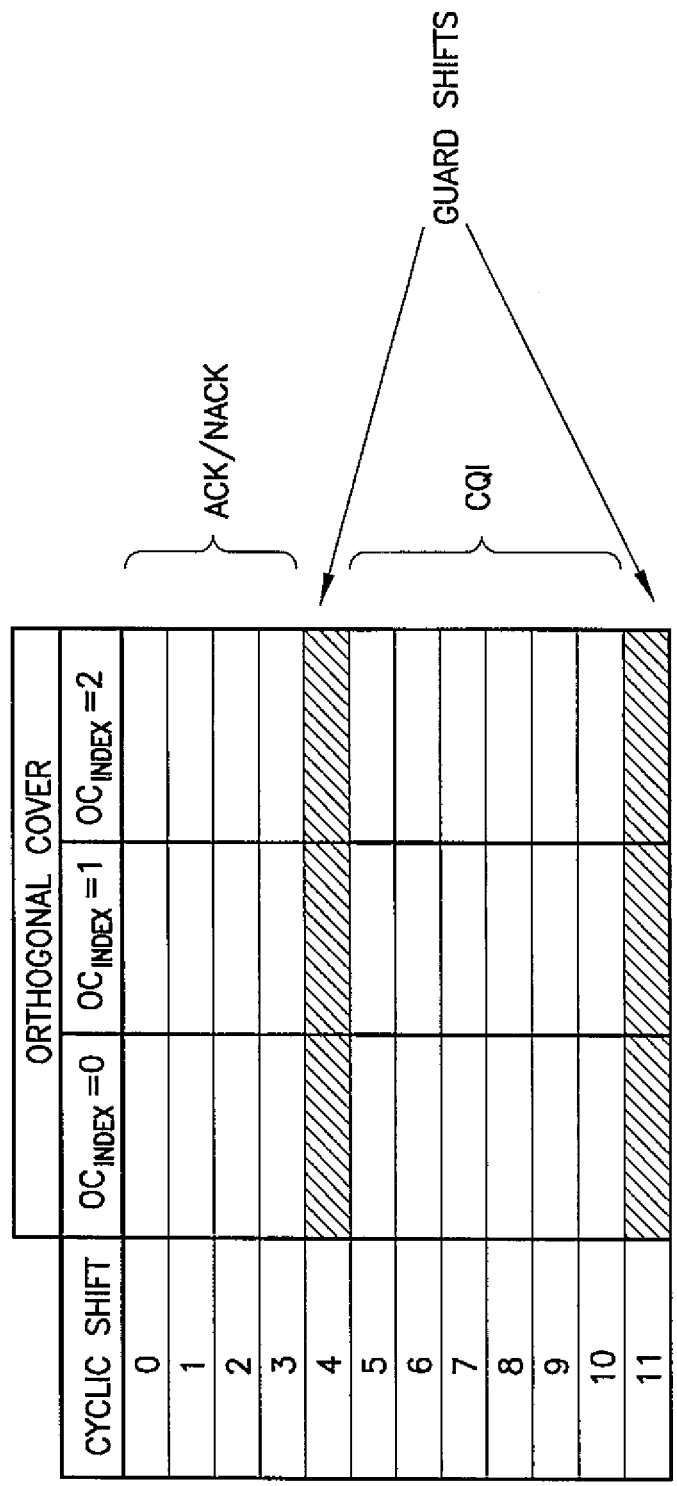
FIG. 4 is a table that depicts multiplexing ACK/NACK and CQI (from different UEs) within the same RB in accordance with exemplary embodiments of this invention.

Discussed now in reference to FIG. 4 is the enhanced channelization arrangement for multiplexing between ACK/NACK and CQI, in accordance with exemplary embodiments of the invention. A given PUCCH resource (e.g., a RB) containing 12 cyclic shifts (CSs, numbered 0 to 11) is divided between ACK/NACK and CQI by means of a localized CS separation (the guard shifts). The CSs are, in general, cyclic shifts of a computer-generated sequence with zero autocorrelation zone (i.e., the sequences do not exhibit constant amplitude). With regard to FIG. 4, it can be noted that: orthogonal cover codes are not applied to the CQI space or portion; a scheduling request may be signaled using the ACK/NACK space; and the CQI resource is used in the case where a certain UE 10 needs to transmit both ACK/NACK and CQI. Reference can be made to Table 1 of R1-080035 for a listing of ACK/NACK OC sequence sets.

$\Delta_{shift}$ ($\Delta_{shift}^{PUCCH}$) is the cyclic shift difference between two adjacent ACK/NACK resources using the same orthogonal cover sequence and can be decided considering multipath delay spreads for the given cell deployment, for example.

In one exemplary approach in accordance with this exemplary embodiment of the invention, the ACK/NACK resource always begins from CS #0, and an even number of adjacent CS resources, denoted as $N_{AN}$, is reserved for ACK/NACK channels: $N_{AN}=(2 \times n) \in \{2,4,6,8\}$. This is the preferred choice in the case when the $\Delta_{shift}^{PUCCH}$ parameter used to configure the ACK/NACK resource equals to 2. In the case when the $\Delta_{shift}^{PUCCH}$ parameter equals three, $N_{AN}$ is preferably a multiple of three: $N_{AN}=(3 \times n) \in \{3, 6, 9\}$. In the case when the $\Delta_{shift}^{PUCCH}$ parameter equals one, $N_{AN} \in \{1, 2, 3, 4, 5, 6, 7, 8, 9\}$. The general rule for ACK/NACK resource configuration is that $\Delta_{shift}^{PUCCH}$ is a factor of $N_{AN}$. That is, $N_{AN}$ is an integer multiple of $\Delta_{shift}^{PUCCH}$, for example, within a range of $\{0, 1, \ldots, 7\}$, where $\Delta_{shift}^{PUCCH}$ is provided by higher layers. Note that $N_{AN}$ can also have a zero-value. Further note that in some cases the number of allowed values for $N_{AN}$ may be limited by the practical signaling constraints.

Two guard CSs (guard band CSs or guard shift CSs) are interposed between the ACK/NACK region and the CQI (or alternatively $N_{CQI}$) is an additional parameter to be signaled from the eNB 12 to the UE 10, for example, via RRC signaling. As a non-limiting example, this information may be conveyed on a broadcast channel using two or three bits. As a non-limiting example, $N_{AN}$ may be broadcast using three bits with allowed values of (0, 1, . . . , 7). Due to the interdependency illustrated above, only one of $N_{AN}$ or $N_{CQI}$ need be signaled, though in some exemplary embodiments both values are signaled. Alternatively, dedicated (UE-specific) control signaling (e.g., RRC control signaling) may be used.

It has been previously decided for LTE that symbol-level, cell-specific CS hopping on the PUCCH is always enabled. Furthermore, it has been previously decided for LTE that the PUCCH utilizes separate CS/OC remapping between two slots to randomize the interference between different CS/OC resources. The exemplary embodiments of this invention accommodate these procedures by defining that CS/OC remapping for the ACK/NACK channel operates only within the $N_{AN}$ cyclic shifts. Correspondingly, CS remapping for the CQI channel operates only within the $N_{CQI}$ cyclic shifts. As noted above, the OC is not applied to the CQI portion.

As non-limiting examples, the exemplary embodiments of this invention may be implemented using either an equation-based (algorithmic) approach or a lookup table-based approach. The corresponding functionality is located at both the UE 10 and the eNB 12.

An example of the equation-based approach is shown below, using notation from the draft specification TS 36.211 v.8.1.0.

$$n_{oc} = \begin{cases} \lfloor n_{AN} \Delta_{shift}^{PUCCH} / N_{AN} \rfloor & \text{for normal cyclic prefix} \\ 2 \cdot \lfloor n_{AN} \Delta_{shift}^{PUCCH} / N_{AN} \rfloor & \text{for extended cyclic prefix} \end{cases}$$

$$\alpha(l) = (\alpha^{(0)} + f_{hop}(l)) \mod N_{AN}$$

$$\alpha^{(0)} = \begin{cases} (n_{AN} \Delta_{shift}^{PUCCH} + \delta_{offset}^{PUCCH} + (n_{oc} \mod \Delta_{shift}^{PUCCH})) \mod N_{AN} & \text{for normal cyclic prefix} \\ (n_{AN} \Delta_{shift}^{PUCCH} + \delta_{offset}^{PUCCH} + n_{oc}/2) \mod N_{AN} & \text{for extended cyclic prefix} \end{cases}$$

where $$\Delta_{shift}^{PUCCH} \in \begin{cases} \{[1], 2, 3\} & \text{for normal cyclic prefix} \\ \{2, 3\} & \text{for extended cyclic prefix} \end{cases}$$

$$\delta_{offset}^{PUCCH} \in \{0, 1, \ldots, \Delta_{shift}^{PUCCH} - 1\}$$

region ($CS_{guard}=2$). These two guard CSs are provided to improve the orthogonality between the two control signaling types (i.e., the ACK/NACK region and the CQI region), and may be located at CS numbers 4 and 11, for example, if one were to assume that $N_{AN}$ is four CSs, as shown in FIG. 4. In addition, the number of CS resources allocated to CQI is denoted as $N_{CQI}$, given by $N_{CQI}=(12-CS_{guard}-N_{AN}) \in \{8, 6, 4, 2\}$ in a non-limiting case where the total number of CSs equals 12. This is the preferred choice in the case when the parameter used to configure the ACK/NACK resource equals two. In the case when $\Delta_{shift}^{PUCCH}$ equals three, $N_{AN}$ is preferably a multiple of three: $N_{CQI}=(12-CS_{guard}-N_{AN}) \in \{7, 4, 1\}$. In the case when the $\Delta_{shift}^{PUCCH}$ parameter equals one, $N_{CQI}=(12-CS_{guard}-N_{AN}) \in \{9, 8, 7, 6, 5, 4, 3, 2, 1\}$. In a case where the CQI portion is absent, $N_{AN}$ would be equal to 12 (or zero) and the guard CSs would not be used. This would indicate that a mixed RB has not been configured (i.e., no mixed RB is present if $N_{AN}=0$).

As compared to the previously proposed approach (see again the section "PUCCH-structure" in R1-080621), $N_{AN}$ and $n_{AN}$ is the resource index, $n_{oc}$ is the orthogonal sequence index, and $\alpha(l)$ is the cyclic shift.

In a further example of the equation-based approach illustrated above, $\delta_{offset}^{PUCCH}=0$.

Changes compared to the existing formulas presented in TS 36.211 v.8.1.0 are:

$N_{sc}^{RB}$ is replaced by $N_{AN}$ and $n_{AN}$ is allowed to assume values up to $3*N_{AN}$ (Normal CP) or $2*N_{AN}$ (Extended CP).

Figure 5:
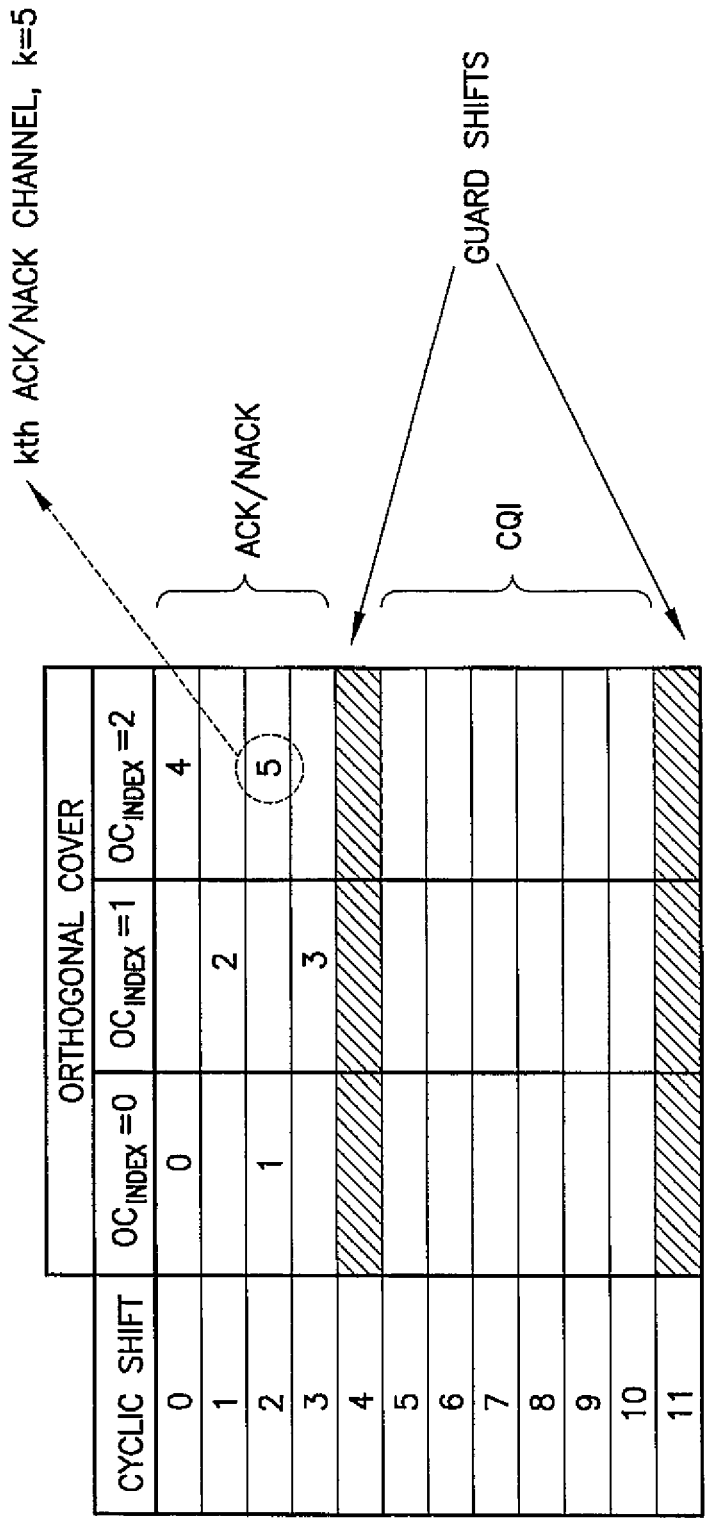
FIG. 5 is a table that depicts resource allocation for the case of six ACK/NACK channels with normal CP, $\Delta_{shift}=2$, $\delta_{offset}=0$, $N_{AN}=4$, in accordance with exemplary embodiments of this invention.

One alternative implementation for the exemplary embodiments of this invention is to apply tabular notation, similar to that used in R1-080035. An example of this approach is shown in FIG. 5. FIG. 5 is a table that depicts resource allocation for the case of six ACK/NACK channels with normal CP, $\Delta_{shift}=2$, $\delta_{offset}=0$, $N_{AN}=4$, in accordance with exemplary embodiments of this invention.

CS/OC remapping for the ACK/NACK channel may be realized in multiple ways, e.g., in terms of logical ACK/NACK channel indexes or by defining separate remapping patterns for cyclic shifts and orthogonal cover sequences. In the case of the latter, the cyclic shift remapping between two slots may be realized by means of a pre-defined cyclic shift hopping pattern. One suitable and non-limiting example of such a remapping pattern for the ACK/NACK channel is described as follows:

$$CS\_s2 = \mathrm{mod}\left(\frac{N}{2} - CS\_s1, N_{AN}\right) \text{ for even values of } CS\_s1$$

$$CS\_s2 = \mathrm{mod}(-CS\_s1, N_{AN}) \text{ for odd values of } CS\_s1,$$

where CS_s1 equals the allocated cyclic shift value for the first slot [0, 1, . . . $N_{AN}$], CS_s2 is the corresponding cyclic shift value for the $2^{nd}$ slot and mod is a modulo operation (modulus after division). An alternative randomization pattern for the ACK/NACK applies CS_s2=mod(-CS_s1, $N_{AN}$) for all values of CS_s1.

The CS remapping pattern to be applied for the CQI resource employs additional knowledge concerning the starting CS position, denoted as CS_cqi0. An exemplary CS remapping pattern for CQI is shown below:

$$CS\_s2 = \mathrm{mod}(-CS\_s1, N_{CQI}) + CS\_cqi0.$$

It should be noted that the use of the exemplary embodiments of this invention does not impact ACK/NACK OC remapping.

A number of advantages can be realized by the use of these exemplary embodiments. For example, they provide a simple extension to the existing ACK/NACK channelization formulas. Further by example, the simplicity of the channelization equations is maintained as $N_{AN}$ is defined to be an integer multiple of $\Delta_{shift}^{PUCCH}$. The constraint on the number of options eliminates a bit of RRC signaling, which thereby enhances signaling bandwidth conservation and usage. In general, the additional signaling needed is minimal, since, for example, only the RRC signaling of $N_{AN}$ (e.g., 2-3 bits) is needed. It is noted that the applied values of $N_{AN}$ may depend on the $\Delta_{shift}^{PUCCH}$ parameter. For example, with two bits, the possible values for $N_{AN}$ could be:

| $\Delta_{shift}^{PUCCH}$ | $N_{AN}$ |
|---|---|
| 1, 2 | 2, 6, 8, 12 or<br>4, 6, 8, 12 or<br>2, 4, 8, 12 or<br>2, 4, 6, 8 |
| 3 | 3, 6, 9, 12 |

In addition, and as a further advantage, the starting CS position of the ACK/NACK channel does not need to be signaled, thereby further reducing the signaling burden. The CS allocation for the CQI may be configured by means of explicit signaling. As another advantage, the use of these exemplary embodiments provides sufficient orthogonality between ACK/NACK and CQI, which is desirable since the ACK/NACK and CQI have different operational requirements in terms of SNR. Furthermore, orthogonality between ACK/NACK and CQI is maintained during CS/OC remapping in that ACK/NACK and CQI each are subject to their own CS randomization within their associated CS space.

Based on the foregoing it should be apparent that the exemplary embodiments of this invention provide a method, apparatus and computer programs to multiplex ACK/NACK and CQI transmissions from a plurality of UEs into a single UL resource block.

FIG. 6 is a logic flow diagram that illustrates the operation of a method, and a result of execution of computer program instructions, in accordance with the exemplary embodiments of this invention. At Block 6A the network access node informs a plurality of UEs of a value that enables the UEs to determine what portion of a shared UL resource block is defined for use in transmitting a first type of signaling from the UEs, and what portion (if any) of the shared UL resource block is defined for use in transmitting a second type of signaling from the UEs. At Block 6B the network access node receives the UL resource block containing at least the first type of signaling from at least some of the plurality of the UEs.

The method, apparatus and computer program instructions of the preceding paragraph, where the UL resource block is characterized by a plurality of cyclic shifts and, associated with each cyclic shift, a plurality of cover codes.

The method, apparatus and computer program instructions of the preceding paragraphs, where the first type of signaling comprises ACK/NACK signaling, where the second type of signaling comprises CQI signaling, where at least one cyclic shift starting with a first cyclic shift is defined as a first group for use in transmitting the ACK/NACK signaling, and where a remaining number of cyclic shifts of the plurality of cyclic shifts, less two cyclic shifts defined for guard band purposes, are defined as a second group for use in transmitting the CQI signaling.

The method, apparatus and computer program instructions of the preceding paragraph, where cyclic shifts of the first group are received by the network node in a first predefined cyclic shift hopping order, and where cyclic shifts of the second group are received by the network node in a second predefined cyclic shift hopping order.

The method, apparatus and computer program instructions of the preceding paragraphs, further comprising remapping cyclic shifts of the first group in a first pre-defined cyclic shift hopping order, and remapping cyclic shifts of the second group in a second pre-defined cyclic shift hopping order. The method, apparatus and computer program instructions of the preceding paragraphs, where said remapping is performed between slots for communications on the PUCCH. The method, apparatus and computer program instructions of the preceding paragraphs, where said remapping comprises random remapping.

The method, apparatus and computer program instructions of the preceding paragraph, where only the ACK/NACK signaling is received by the network node in association with the cover codes.

The method, apparatus and computer program instructions of the preceding paragraphs, where the network access node informs the plurality of UEs of the value using a broadcast channel or by using UE-specific RRC signaling, such as by using a RRC control message.

FIG. 7 is another logic flow diagram that illustrates the operation of a method, and a result of execution of computer program instructions, in accordance with the exemplary embodiments of this invention. At Block 7A a UE receives from a network access node certain information that enables the UE to determine what portion of a shared UL resource block is defined for use in transmitting a first type of signaling from the UE, and what portion (if any) of the shared UL resource block is defined for use in transmitting a second type of signaling from the UE. At Block 7B the UE transmits in the UL resource block at least the first type of signaling.

The method, apparatus and computer program instructions of the preceding paragraph, where the UL resource block is characterized by a plurality of cyclic shifts and, associated with each cyclic shift, a plurality of cover codes.

The method, apparatus and computer program instructions of the preceding paragraphs, where the first type of signaling comprises ACK/NACK signaling, where the second type of signaling comprises CQI signaling, where at least one cyclic shift starting with a first cyclic shift is defined as a first group for use in transmitting the ACK/NACK signaling, and where a remaining number of cyclic shifts of the plurality of cyclic shifts, less two cyclic shifts defined for guard band purposes, are defined as a second group for use in transmitting the CQI signaling.

The method, apparatus and computer program instructions of the preceding paragraph, further comprising remapping cyclic shifts of the first group in a first pre-defined cyclic shift hopping order, and remapping cyclic shifts of the second group in a second pre-defined cyclic shift hopping order. The method, apparatus and computer program instructions of the preceding paragraphs, where said remapping comprises random remapping.

The method, apparatus and computer program instructions of the preceding paragraph, where a particular cover code is applied to only the ACK/NACK signaling.

The method, apparatus and computer program instructions of the preceding paragraphs, where the certain information is received from a broadcast channel.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 8:
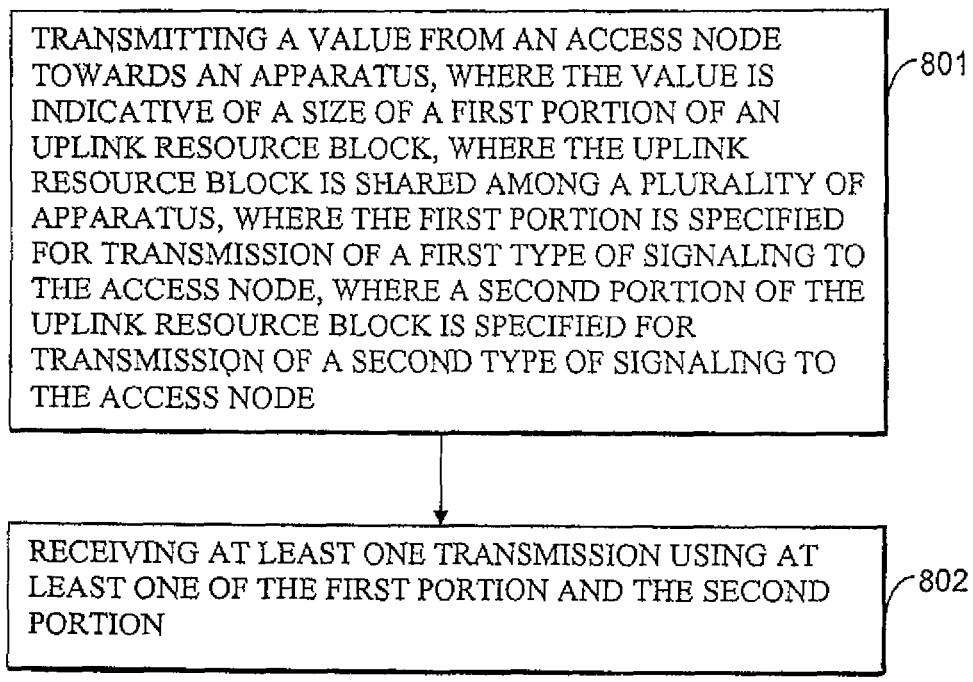
FIG. 8 is a logic flow diagram that illustrates for the network access node (eNB) the operation of another exemplary method, and a result of execution of exemplary computer program instructions, in accordance with the exemplary embodiments of this invention.

(1) In one exemplary embodiment, and with reference to FIG. 8, a method comprising: transmitting a value from an access node towards an apparatus, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node (801); and receiving at least one transmission using at least one of the first portion and the second portion (802).

A method as above, where the first type of signaling comprises acknowledgement (ACK/NACK) signaling and the second type of signaling comprises channel quality indicator (CQI) signaling. A method as in any above, where the uplink resource block further comprises a third portion that acts as a guard band between the first portion and the second portion. A method as in any above, where the size of the first portion is indicative of a number of resources in the uplink resource block that are allocated for the first type of signaling. A method as in any above, where the value is a first value, the method further comprising: using the first value to determine a second value indicative of a size of the second portion of the uplink resource block. A method as in any above, where the at least one transmission is received on a physical uplink control channel. A method as in any above, where the size of the first portion is an integer multiple of $\Delta_{shift}^{PUCCH}$. A method as in any above, further comprising: performing separate cyclic shift/orthogonal cover randomized remapping for the first portion and the second portion. A method as in any above, further comprising: deriving, from the received at least one transmission, the first type of signaling and the second type of signaling based on the size of the first portion and zero or more other parameters. A method as in any above, where the access node comprises an evolved Node B and the apparatus comprises a user equipment, where the evolved Node B and the user equipment comprise entities within an evolved universal terrestrial radio access network.

A method as in any above, where the first type of signaling comprises acknowledgement (ACK/NACK) signaling. A method as in any above, where the second type of signaling comprises channel quality indicator (CQI) signaling. A method as in any above, where the uplink resource block further comprises a third portion that acts as a first guard band and a fourth portion that acts as a second guard band. A method as in any above, where the uplink resource block further comprises a fourth portion that acts as a second guard band and is disposed at one of a beginning of the uplink resource block or an end of the uplink resource block. A method as in any above, where the uplink resource block further comprises a third portion that acts as a first guard band between the first portion and the second portion and a fourth portion that acts as a second guard band and is disposed at one of a beginning of the uplink resource block or an end of the uplink resource block.

A method as in any above, where the third portion (and/or fourth portion) improves orthogonality between the first type of signaling and the second type of signaling. A method as in any above, where the third portion (and/or fourth portion) is (are) located at CS index number 4 (and CS index number 11, respectively). A method as in any above, where the third portion is located at CS index number 11 and a fourth portion is located at another CS index number, where the location of the fourth portion is dependent on a number of CS reserved for the first type of signaling (e.g., ACK/NACK signaling). A method as in any above, where a size of the second portion is dependent on a size of the first portion and a size of the third portion. A method as in any above, where a size of the second portion is dependent on a size of the first portion, a size of the third portion and a size of the fourth portion. A method as in any above, where a size of the third portion and a size of the fourth portion are collectively considered a size of the guard bands. A method as in any above, further comprising: transmitting a third value indicative of a size of the third portion. A method as in any above, further comprising: transmitting a fourth value indicative of a size of the fourth portion. A method as in any above, further comprising: transmitting a fifth value indicative of a collective size of the third and fourth portions.

A method as in any above, where the uplink resource block comprises a plurality of resources identified by a plurality of orthogonal cover indices and a plurality of cyclic shift indices. A method as in any above, where the size of the second portion is indicative of a number of resources in the uplink resource block that are allocated for the second type of signaling. A method as in any above, where the size of the second portion is indicative of a number of resources in the uplink resource block that are allocated for the second type of signaling.

A method as in any above, where the first portion consists of a first number of adjacent CS resources in the uplink resource block. A method as in any above, where the first number of adjacent CS resources comprises an integer multiple of $\Delta_{shift}^{PUCCH}$. A method as in any above, where the first number of adjacent CS resources comprises a multiple of three. A method as in any above, where the first number of adjacent CS resources consists of 2, 4, 6 or 8 adjacent CS resources. A method as in any above, where the first number of adjacent CS resources consists of 3, 6 or 9 adjacent CS resources. A method as in any above, where the first number of adjacent CS resources consists of 1, 2, 3, 4, 5, 6, 7, 8 or 9 adjacent CS resources. A method as in any above, where the first number of adjacent CS resources consists of 1, 2, 3, 4, 5, 6, 7, 8, 9, 10 or 11 adjacent CS resources. A method as in any above, where the first number of adjacent CS resources consists of 12 adjacent CS resources. A method as in any above, where $\Delta_{shift}(\Delta_{shift}^{PUCCH})$ is a cyclic shift difference between two adjacent CS resources using a same orthogonal cover sequence. A method as in any above, where $\Delta_{shift}$ has a value of 1, 2 or 3. A method as in any above, where $\Delta_{shift}$ is a factor of the first number of adjacent CS resources. A method as in any above, further comprising: transmitting the value for $\Delta_{shift}$. A method as in any above, where $\Delta_{shift}$ is decided considering multipath delay spreads for a given cell deployment.

A method as in any above, where the second portion consists of a second number of adjacent CS resources in the uplink resource block. A method as in any above, where the second number of adjacent CS resources is dependent on the first number of adjacent CS resources. A method as in any above, where the second number of adjacent CS resources consists of 1, 4 or 7 adjacent CS resources. A method as in any above, where the second number of adjacent CS resources consists of 2, 4, 6 or 8 adjacent CS resources. A method as in any above, where the second number of adjacent CS resources consists of 1, 2, 3, 4, 5, 6, 7, 8 or 9 adjacent CS resources. A method as in any above, where the second number of adjacent CS resources consists of 1, 2, 3, 4, 5, 6, 7, 8, 9, 10, or 11 adjacent CS resources. A method as in any above, where the second number of adjacent CS resources consists of 12 adjacent CS resources.

A method as in any above, where the value is transmitted on a broadcast channel. A method as in any above, where the value is transmitted using two or three bits. A method as in any above, where a second value indicative of a size of the second portion is not transmitted. A method as in any above, further comprising: transmitting a second value indicative of a size of the second portion is transmitted. A method as in any above, where the value is transmitted using dedicated control signaling. A method as in any above, where the value is transmitted using RRC control signaling.

A method as in any above, where CS/OC remapping for an ACK/NACK channel operates only within (cyclic shifts of) the first portion ($N_{AN}$ cyclic shifts). A method as in any above, where CS remapping for a CQI channel operates only within (cyclic shifts of) the second portion ($N_{CQI}$ cyclic shifts). A method as in any above, where CS/OC remapping for an ACK/NACK channel is realized in terms of logical ACK/NACK channel indexes or by defining separate remapping patterns for cyclic shifts and orthogonal cover sequences. A method as in any above, where the method is implemented using an equation-based (algorithmic) approach or a lookup table-based approach. A method as in any above, where resource (CS) allocation for CQI is configured with explicit signaling. A method as in any above, where orthogonality between ACK/NACK and CQI is maintained during CS/OC remapping in that ACK/NACK and CQI each are subject to separate CS randomization within an associated CS space. A method as in any above, further comprising: multiplexing ACK/NACK and CQI transmissions from the plurality of UEs into the uplink resource block.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

(2) In another exemplary embodiment, a program storage device readable by a machine, tangibly embodying a program of instructions executable by the machine for performing operations, said operations comprising: transmitting a value from an access node towards an apparatus, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node (801); and receiving at least one transmission using at least one of the first portion and the second portion (802).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described elsewhere herein, and, in particular, one or more aspects of the exemplary embodiments of the invention as relating to exemplary methods described herein.

(3) In another exemplary embodiment, an apparatus comprising: a transmitter configured to transmit a value towards another apparatus, where the value is indicative of a size of a first portion of an uplink resource block, where the uplink resource block is shared among a plurality of other apparatus, where the first portion is specified for transmission of a first type of signaling to the apparatus, where a second portion of the uplink resource block is specified for transmission of a second type of signaling to the apparatus; and a receiver configured to receive at least one transmission using at least one of the first portion and the second portion.

An apparatus as above, further comprising one or more aspects of the exemplary embodiments of the invention as described herein.

(4) In another exemplary embodiment, an apparatus comprising: means for transmitting a value from an access node towards an apparatus, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and means for receiving at least one transmission using at least one of the first portion and the second portion.

An apparatus as above, where the means for transmitting comprises a transmitter and the means for receiving comprises a receiver. An apparatus as in any above, further comprising one or more aspects of the exemplary embodiments of the invention as described herein.

(5) In another exemplary embodiment, an apparatus comprising: transmitter circuitry configured to transmit a value towards another apparatus, where the value is indicative of a size of a first portion of an uplink resource block, where the uplink resource block is shared among a plurality of other apparatus, where the first portion is specified for transmission of a first type of signaling to the apparatus, where a second portion of the uplink resource block is specified for transmission of a second type of signaling to the apparatus; and receiver circuitry configured to receive at least one transmission using at least one of the first portion and the second portion.

An apparatus as above, where the apparatus comprises an integrated circuit. An apparatus as in any above, further comprising one or more aspects of the exemplary embodiments of the invention as described herein.

Figure 9:
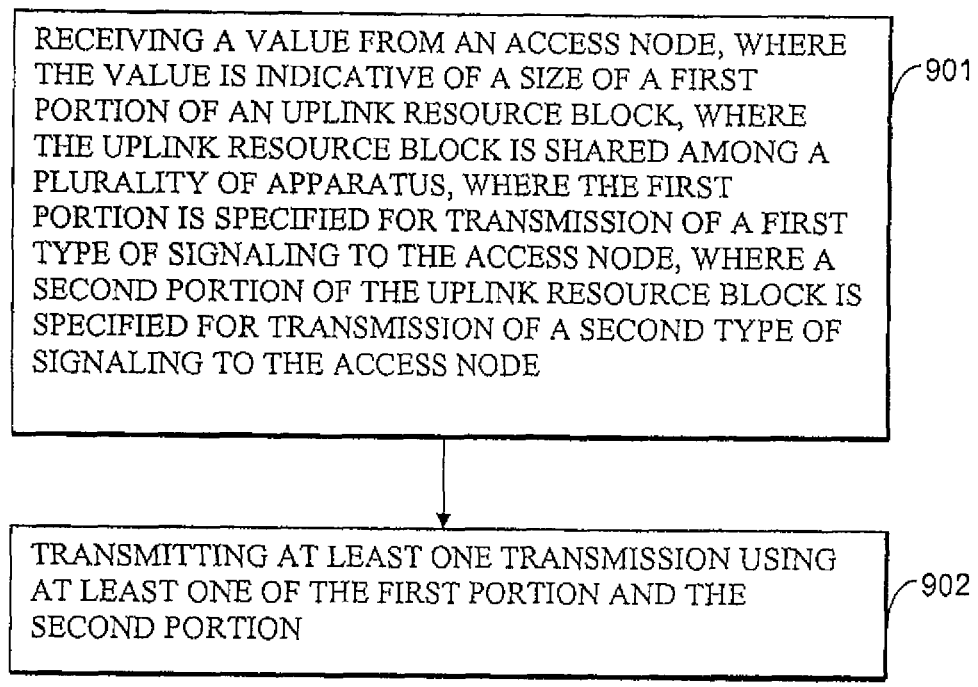
FIG. 9 is a logic flow diagram that illustrates for the user equipment the operation of another exemplary method, and a result of execution of exemplary computer program instructions, in accordance with the exemplary embodiments of this invention.

(6) In another exemplary embodiment, and with reference to FIG. 9, a method comprising: receiving a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node (901); and transmitting at least one transmission using at least one of the first portion and the second portion (902).

A method as above, where the first type of signaling comprises acknowledgement (ACK/NACK) signaling and the second type of signaling comprises channel quality indicator (CQI) signaling. A method as in any above, where the uplink resource block further comprises a third portion that acts as a guard band between the first portion and the second portion. A method as in any above, where the size of the first portion is indicative of a number of resources in the uplink resource block that are allocated for the first type of signaling. A method as in any above, where the value is a first value, the method further comprising: using the first value to determine a second value indicative of a size of the second portion of the uplink resource block. A method as in any above, where the at least one transmission is transmitted on a physical uplink control channel. A method as in any above, where the size of the first portion is an integer multiple of $\Delta_{shift}^{PUCCH}$. A method as in any above, where the access node comprises an evolved Node B and the apparatus comprises a user equipment, where the evolved Node B and the user equipment comprise entities within an evolved universal terrestrial radio access network.

A method as in any above, where the first type of signaling comprises acknowledgement (ACK/NACK) signaling. A method as in any above, where the second type of signaling comprises channel quality indicator (CQI) signaling. A method as in any above, where the uplink resource block further comprises a third portion that acts as a first guard band and a fourth portion that acts as a second guard band. A method as in any above, where the uplink resource block further comprises a fourth portion that acts as a second guard band and is disposed at one of a beginning of the uplink resource block or an end of the uplink resource block. A method as in any above, where the uplink resource block further comprises a third portion that acts as a first guard band between the first portion and the second portion and a fourth portion that acts as a second guard band and is disposed at one of a beginning of the uplink resource block or an end of the uplink resource block.

A method as in any above, where the third portion (and/or fourth portion) improves orthogonality between the first type of signaling and the second type of signaling. A method as in any above, where the third portion (and/or fourth portion) is (are) located at CS index number 4 (and CS index number 11, respectively). A method as in any above, where the third portion is located at CS index number 11 and a fourth portion is located at another CS index number, where the location of the fourth portion is dependent on a number of CS reserved for the first type of signaling (e.g., ACK/NACK signaling). A method as in any above, where a size of the second portion is dependent on a size of the first portion and a size of the third portion. A method as in any above, where a size of the second portion is dependent on a size of the first portion, a size of the third portion and a size of the fourth portion. A method as in any above, where a size of the third portion and a size of the fourth portion are collectively considered a size of the guard bands. A method as in any above, further comprising: transmitting a third value indicative of a size of the third portion. A method as in any above, further comprising: receiving a fourth value indicative of a size of the fourth portion. A method as in any above, further comprising: receiving a fifth value indicative of a collective size of the third and fourth portions.

A method as in any above, where the uplink resource block comprises a plurality of resources identified by a plurality of orthogonal cover indices and a plurality of cyclic shift indices. A method as in any above, where the size of the second portion is indicative of a number of resources in the uplink resource block that are allocated for the second type of signaling. A method as in any above, where the size of the second portion is indicative of a number of resources in the uplink resource block that are allocated for the second type of signaling.

A method as in any above, where the first portion consists of a first number of adjacent CS resources in the uplink resource block. A method as in any above, where the first number of adjacent CS resources comprises an integer multiple of $\Delta_{shift}^{PUCCH}$. A method as in any above, where the first number of adjacent CS resources comprises a multiple of three. A method as in any above, where the first number of adjacent CS resources consists of 2, 4, 6 or 8 adjacent CS resources. A method as in any above, where the first number of adjacent CS resources consists of 3, 6 or 9 adjacent CS resources. A method as in any above, where the first number of adjacent CS resources consists of 1, 2, 3, 4, 5, 6, 7, 8 or 9 adjacent CS resources. A method as in any above, where the first number of adjacent CS resources consists of 1, 2, 3, 4, 5, 6, 7, 8, 9, 10 or 11 adjacent CS resources. A method as in any above, where the first number of adjacent CS resources consists of 12 adjacent CS resources. A method as in any above, where $\Delta_{shift}^{PUCCH}$) is a cyclic shift difference between two adjacent CS resources using a same orthogonal cover sequence. A method as in any above, where $\Delta_{shift}$ has a value of 1, 2 or 3. A method as in any above, where $\Delta_{shift}$ is a factor of the first number of adjacent CS resources. A method as in any above, further comprising: transmitting the value for $\Delta_{shift}$. A method as in any above, where $\Delta_{shift}$ is decided considering multipath delay spreads for a given cell deployment.

A method as in any above, where the second portion consists of a second number of adjacent CS resources in the uplink resource block. A method as in any above, where the second number of adjacent CS resources is dependent on the first number of adjacent CS resources. A method as in any above, where the second number of adjacent CS resources consists of 1, 4 or 7 adjacent CS resources. A method as in any above, where the second number of adjacent CS resources consists of 2, 4, 6, or 8 adjacent CS resources. A method as in any above, where the second number of adjacent CS resources consists of 1, 2, 3, 4, 5, 6, 7, 8 or 9 adjacent CS resources. A method as in any above, where the second number of adjacent CS resources consists of 1, 2, 3, 4, 5, 6, 7, 8, 9, 10, or 11 adjacent CS resources. A method as in any above, where the second number of adjacent CS resources consists of 12 adjacent CS resources.

A method as in any above, where the value is received on a broadcast channel. A method as in any above, where the value is received using two or three bits. A method as in any above, where a second value indicative of a size of the second portion is not received. A method as in any above, further comprising: receiving a second value indicative of a size of the second portion. A method as in any above, where the value is received using dedicated control signaling. A method as in any above, where the value is received using RRC control signaling.

A method as in any above, where CS/OC remapping for an ACK/NACK channel operates only within (cyclic shifts of) the first portion ($N_{AN}$ cyclic shifts). A method as in any above, where CS remapping for a CQI channel operates only within (cyclic shifts of) the second portion ($N_{CQI}$ cyclic shifts). A method as in any above, where CS/OC remapping for an ACK/NACK channel is realized in terms of logical ACK/NACK channel indexes or by defining separate remapping patterns for cyclic shifts and orthogonal cover sequences. A method as in any above, where the method is implemented using an equation-based (algorithmic) approach or a lookup table-based approach. A method as in any above, where resource (CS) allocation for CQI is configured with explicit signaling. A method as in any above, where orthogonality between ACK/NACK and CQI is maintained during CS/OC remapping in that ACK/NACK and CQI each are subject to separate CS randomization within an associated CS space.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

(7) In another exemplary embodiment, a program storage device readable by a machine, tangibly embodying a program of instructions executable by the machine for performing operations, said operations comprising: receiving a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node (901); and transmitting at least one transmission using at least one of the first portion and the second portion (902).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described elsewhere herein, and, in particular, one or more aspects of the exemplary embodiments of the invention as relating to exemplary methods described herein.

(8) In another exemplary embodiment, an apparatus comprising: a receiver configured to receive a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and a transmitter configured to transmit at least one transmission using at least one of the first portion and the second portion.

An apparatus as above, further comprising one or more aspects of the exemplary embodiments of the invention as described herein.

(9) In another exemplary embodiment, an apparatus comprising: means for receiving a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and means for transmitting at least one transmission using at least one of the first portion and the second portion.

An apparatus as above, where the means for transmitting comprises a transmitter and the means for receiving comprises a receiver. An apparatus as in any above, further comprising one or more aspects of the exemplary embodiments of the invention as described herein.

(10) In another exemplary embodiment, an apparatus comprising: receiver circuitry configured to receive a value from an access node, where the value is indicative of a size of a first portion of an uplink resource block, where the uplink resource block is shared among a plurality of apparatus, where the first portion is specified for transmission of a first type of signaling to the access node, where a second portion of the uplink resource block is specified for transmission of a second type of signaling to the access node; and transmitter circuitry configured to transmit at least one transmission using at least one of the first portion and the second portion.

An apparatus as above, where the apparatus comprises an integrated circuit. An apparatus as in any above, further comprising one or more aspects of the exemplary embodiments of the invention as described herein.

(11) In another exemplary embodiment, a system comprising: a first apparatus and a second apparatus, the first apparatus comprising a first transmitter configured to transmit a value towards the second apparatus, where the value is indicative of a size of a first portion of an uplink resource block, where the uplink resource block is shared among a plurality of other apparatus, where the first portion is specified for transmission of a first type of signaling to the apparatus, where a second portion of the uplink resource block is specified for transmission of a second type of signaling to the apparatus; and a first receiver configured to receive at least one transmission from the second apparatus using at least one of the first portion and the second portion;

the second apparatus comprising: a second receiver configured to receive the value from the first apparatus; and a second transmitter configured to transmit at least one transmission to the first apparatus using at least one of the first portion and the second portion.

A system as above, further comprising one or more aspects of the exemplary embodiments of the invention as described herein.

The various blocks shown in FIGS. 6-9 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangements of the blocks shown in FIGS. 6-9 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 6-9 so as to implement one or more further exemplary embodiments of the invention, such as those described in further detail herein.

That is, the non-limiting, exemplary embodiments of the invention shown in FIGS. 6-9 may be implemented, practiced or utilized in conjunction with one or more further aspects in any combination (e.g., any combination that is practicable, suitable and/or feasible) and are not limited only to the blocks, steps, functions and/or operations illustrated in FIGS. 6-9.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

Further, the various names used for the described parameters (e.g., $N_{AN}$, $\Delta_{shift}^{PUCCH}$, $N_{CQI}$, etc.) are not intended to be limiting in any respect, as these parameters may be identified by any suitable names. Further, the formulas and expressions that use these various parameters may differ from those expressly disclosed herein.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

transmitting, using one of a broadcast channel and an RRC control message and by a base station, a value from the base station towards a plurality of user equipment including a given user equipment, where the value is indicative of what portion, as a first portion, of an uplink resource block is specified for transmission of a first type of signaling to the base station and what portion, as a second portion, of the uplink resource block is specified for transmission of a second type of signaling to the base station, where the first type of signaling comprises acknowledgement signaling and the second type of signaling comprises channel quality indicator signaling;

receiving by the base station at least one transmission from the given user equipment a given uplink resource block having at least one of the first portion and the second portion where the given uplink resource block is one shared uplink resource block shared among the plurality of user equipment, including said given user equipment, and wherein the acknowledgement signaling and channel quality indicator signaling from the given user equipment and acknowledgement and channel quality indicator signaling from at least one other user equipment is received as a multiplexed transmission in the one shared uplink resource block shared among the plurality of user equipment; and determining, from the received at least one transmission, one or both of acknowledgement information from the first type of signaling and channel quality indicator information from the second type of signaling based on the value and corresponding portion of the uplink resource block specified for transmission of the first type of signaling and the portion of the uplink resource block specified for transmission of the second type of signaling.

2. A method as in claim 1, where the uplink resource block further comprises a third portion that acts as a guard band between the first portion and the second portion.

3. A method as in claim 1, further comprising determining a size of the first portion of the uplink resource block using the value, where the size of the first portion is indicative of a number of resources in the uplink resource block that are allocated for the first type of signaling.

4. A method as in claim 1, further comprising determining a size of the first portion using the value, and using the value to determine another value indicative of a size of the second portion of the uplink resource block.

5. A method as in claim 1, where the at least one transmission is received on a physical uplink control channel.

6. A method as in claim 1, where $\Delta_{shift}^{PUCCH}$ is a cyclic shift difference between two adjacent resources using a same orthogonal cover sequence and a size of the first portion is an integer multiple of $\Delta_{shift}^{PUCCH}$.

7. A method as in claim 1, further comprising: performing separate cyclic shift/orthogonal cover randomized remapping for the first portion and the second portion.

8. A method as in claim 1, where the base station comprises an evolved Node B, where the evolved Node B and the user equipment comprise entities within an evolved universal terrestrial radio access network.

9. A method as in claim 1, where the method is implemented as a computer program stored on a non-transitory computer-readable medium.

10. An apparatus comprising:

a transmitter configured, using one of a broadcast channel and an RRC control message and by a base station, to transmit a value towards plurality of user equipment including a given user equipment, where the value is indicative of what portion, as a first portion, of an uplink resource block is specified for transmission of a first type of signaling to the base station and what portion, as a second portion, of the uplink resource block is specified for transmission of a second type of signaling to the base station where the first type of signaling comprises acknowledgement signaling and the second type of signaling comprises channel quality indicator signaling;

a receiver configured to receive by the base station at least one transmission from the given user equipment a given uplink resource block having at least one of the first portion and the second portion where the given uplink resource block is one shared uplink resource block shared among the plurality of user equipment, including said given user equipment, and wherein the acknowledgement signaling and channel quality indicator signaling from the given user equipment and acknowledgement signaling and channel quality indicator signaling from at least one other user equipment is received as a multiplexed transmission in the one shared uplink resource block shared among the plurality of user equipment; and a processor configured to cause the apparatus to determine, from the received at least one transmission, one or both of acknowledgement information from the first type of signaling and channel quality information from the second type of signaling based on the value and corresponding portion of the uplink resource block specified for transmission of the first type of signaling and the portion of the uplink resource block specified for transmission of the second type of signaling.

11. An apparatus as in claim 10, where the apparatus comprises an evolved Node B within an evolved universal terrestrial radio access network.

12. A method comprising:

receiving, by a given user equipment, a value, using one of a broadcast channel and an RRC control message from an base station transmitted to a plurality of user equipment including the given user equipment, where the value is indicative of what portion, as a first portion, of an uplink resource block is specified for transmission of a first type of signaling to the base station and what portion, as a second portion, of the uplink resource block is specified for transmission of a second type of signaling to the base station, where the first type of signaling comprises acknowledgement signaling and the second type of signaling comprises channel quality indicator signaling;

determining by the given user equipment based at least on the value the first portion of the uplink resource block that is specified for the first type of signaling and the second portion of the uplink resource block that is specified for the second type of signaling; and transmitting by the given user equipment at least one given transmission comprising at least one of acknowledgement information in the first portion and quality indicator information in the second portion, where the uplink resource block is one shared uplink resource block shared among the plurality of user equipment, including said given user equipment, and wherein the acknowledgement signaling and channel quality indicator signaling from the given user equipment and acknowledgement signaling and channel quality indicator signaling from at least one other user equipment is transmitted as a multiplexed transmission in the one shared uplink resource block shared among the plurality of user equipment.

13. A method as in claim 12, where the method is implemented as a computer program stored on a non-transitory computer-readable medium.

14. An apparatus comprising:

a receiver configured to receive by a given user equipment, a value, using one of a broadcast channel and an RRC control message from a base station transmitted to a plurality of user equipment including the given user equipment, where the value is indicative of what portion, as a first portion, of an uplink resource block is specified for transmission of a first type of signaling to the base station and what portion, as a second portion, of the uplink resource block is specified for transmission of a second type of signaling to the base station, where the first type of signaling comprises acknowledgement signaling and the second type of signaling comprises channel quality indicator signaling;

determining by the given user equipment based at least on the value the first portion of the uplink resource block that is specified for the first type of signaling and the second portion of the uplink resource block that is specified for the second type of signaling; and a transmitter configured to transmit by the given user equipment at least one transmission comprising at least one of acknowledgement information in the first portion and quality indicator information in the second portion, where the uplink resource block is one shared uplink resource block shared among the plurality of user equipment, including said given user equipment, and wherein the acknowledgement signaling and channel quality indicator signaling from the given user equipment and acknowledgement signaling and channel quality indicator signaling from at least one other user equipment is transmitted as a multiplexed transmission in the one shared uplink resource block shared among the plurality of user equipment.

15. An apparatus as in claim 14, where the apparatus comprises a user equipment within an evolved universal terrestrial radio access network.

* * * * *

UNITED STATES PATENT AND TRADEMARK OFFICE
CERTIFICATE OF CORRECTION

PATENT NO. : 10,383,111 B2
APPLICATION NO. : 14/713357
DATED : August 13, 2019
INVENTOR(S) : Kari P. Pajukoski et al.

It is certified that error appears in the above-identified patent and that said Letters Patent is hereby corrected as shown below:

In the Claims

In Claim 10:
Column 24, Line 18, "towards" should be deleted and -- towards a -- should be inserted.

Signed and Sealed this
Eighth Day of October, 2019

Andrei Iancu
*Director of the United States Patent and Trademark Office*